July 19, 1960
D. L. JONES ET AL
2,945,296
METHOD OF AFFIXING FINS TO TUBING
Filed Feb. 13, 1956
2 Sheets-Sheet 1
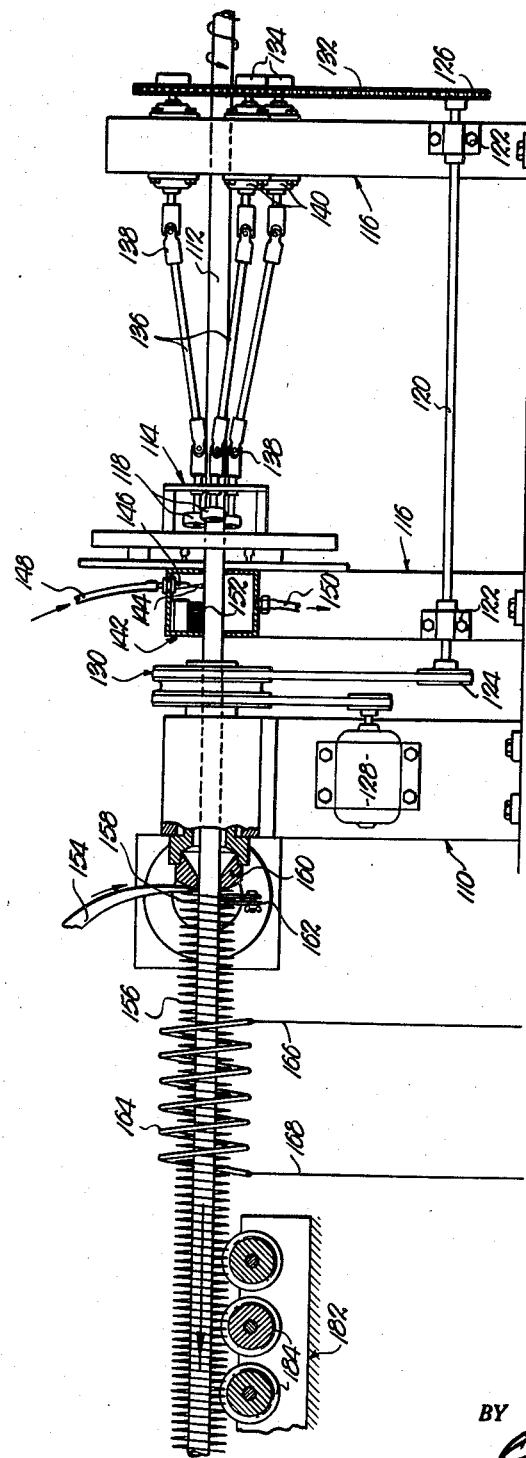
Fig. 1.
INVENTORS.
Dougan L. Jones
Cornelis Langewis
BY
ATTORNEY.

July 19, 1960
D. L. JONES ET AL
2,945,296
METHOD OF AFFIXING FINS TO TUBING
Filed Feb. 13, 1956
2 Sheets-Sheet 2
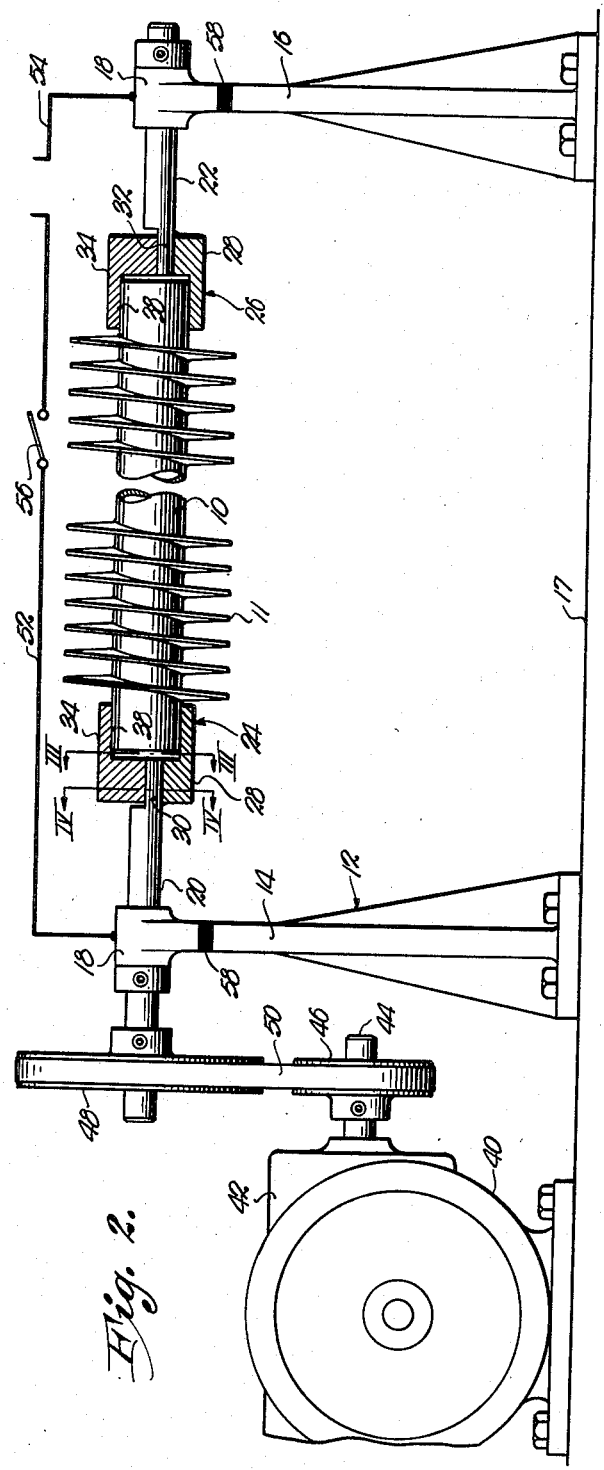
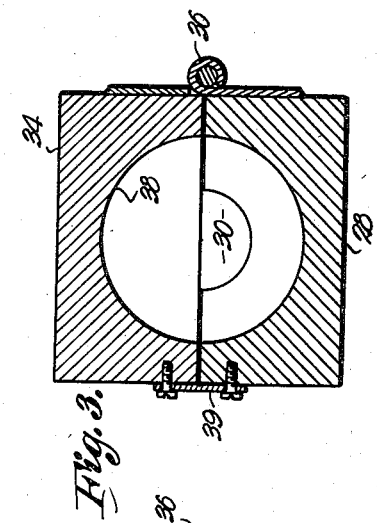
Fig. 3.
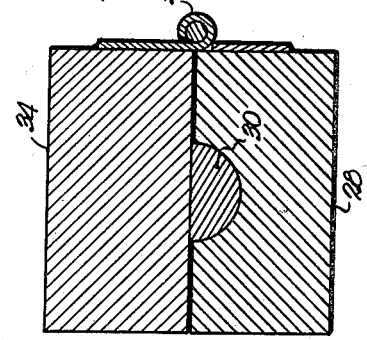
Fig. 4.
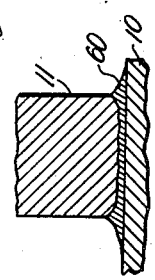
Fig. 5.
INVENTORS.
Dougan L. Jones
Cornelis Langewis
BY
ATTORNEY.

United States Patent Office 2,945,296
Patented July 19, 1960

2,945,296

METHOD OF AFFIXING FINS TO TUBING

Dougan L. Jones, Lees Summit, and Cornelis Langewis, Hickman Mills, Mo., assignors to The Marley Company, Kansas City, Mo., a corporation of Delaware Filed Feb. 13, 1956, Ser. No. 565,006

3 Claims. (Cl. 29—496)

This invention relates to improvements in heat exchangers and particularly to equipment of that type which contemplates the utilization of finned tubing, the primary object being to provide a new and improved method of producing a finned tube permitting utilization of dissimilar metals of high heat conductivity and presenting an excellent juncture between the fin and the tube upon which it is mounted that will not break down under influence of fluids of relative high temperature to be directed through the tube.

It is an important object of the present invention to provide a method of producing finned tubing employing a metal-joining process that produces a brazing alloy between one edge of the fin and the tube upon which it is spirally wound or otherwise placed, which alloy not only adheres to the base metals which it interconnects, but combines with the proximal surfaces of the tube and fin so as to create a strong and sound union of high heat conductivity between the two parts of the finished article.

Another important object of this invention is to provide a method of securing a spiral plate or other type of fin to a tube utilizing nonferrous metallic alloy materials, for example, cadmium, and zinc, and/or other metals which are initially placed on the tube in conjunction with a flux material and subsequently fused in the presence of a reagent so as to produce a brazing alloy or filler metal which not only flows into the butt joint between the fin and the tube by capillary action, but builds up reinforcing fillets between the fin and the tube serving the additional function of increased heat dissipation.

It is the most important object of this invention, however, to provide a method of affixing spiral fins or the like to a metal tube in which the quantity of brazing alloy attaching the fin to the tube is substantially uniform around the circumference of the tube.

A further important object relates to a method in which a metal tube having a spiral fin wound therearound is rotated during the resistance or induction brazing process to maintain the fused brazing alloy adjacent the area of the fin proximal to the tube and thereby prevent running or dripping of the alloy and the flux toward the outer periphery of the fin.

Also an aim of this invention is the provision of a method of affixing a spiral fin to a metal tube in which successive operations of placing a fluxing material containing a nonferrous metal compound on the tube, winding a spiral fin on the tube, and induction brazing of the fin to the tube are carried out while continuously rotating and advancing the tube along a predetermined path of travel.

Reference may be had to the accompanying drawing for a better understanding of the method of the present invention, wherein:

Figure 1 is a diagrammatical view having various parts in cross-section, illustrating one type of finning and brazing machine in which flux is applied to the tube, a metal fin wound therearound, and the fin affixed to the tube by induction brazing while the tube is continuously rotated and advanced through the machine.

Fig. 2 is a diagrammatical view having various parts in cross-section, illustrating another type of a brazing machine in which a metallic tube having a spiral fin wound therearound may be rotated on its longitudinal axis while subjected to resistance heating.

Fig. 3 is an enlarged, cross-sectional view taken on the line III—III of Fig. 2, showing a type of holding clamp for securing the tube to the brazing machine.

Fig. 4 is an enlarged cross-sectional view taken on the line IV—IV of Fig. 2; and Fig. 5 is an enlarged, fragmentary, microscopic view showing the fin connected to the tube by a metallic union.

It has long been recognized in the field of heat-exchange structures utilizing finned tubing that maximum efficiency, so far as heat conductivity is concerned, can best be attained if the fin itself is joined to the tube in such manner as to eliminate all interference with conduction of heat. Many problems have arisen, however, in attempting to produce maximum efficiency primarily because of the fact that the trade has become accustomed to certain metals having known resistances to corrosion and possessing high heat transfer characteristics. The problem has been further enhanced by virtue of the necessity of using metals and processes which do not unduly increase the cost of production.

With this in mind the industry has resorted to many methods of joining the fin to the tube, but in no case have all the problems been satisfactorily met. For example, it has long been known that many metals can be used in the production of finned tubing. So far as the tube is concerned, many metals can be utilized that have the desired characteristics of high heat conductivity and substantially resistant to corrosion, such metals including copper, admiralty, carbon and stainless steel, and aluminum. Copper has been so universally accepted as a metal having the desired properties that it is most difficult to teach the industry that other metals would be equally satisfactory. Furthermore, competition requires that the cost of manufacture be kept to a minimum and those who have attempted to solve the problems by resorting to other metals have been faced with other difficulties.

Accordingly, for the present at least, it is incumbent upon manufacturers of finned tubing to use copper and to a somewhat lesser extent, admiralty or carbon steel tubing and a satisfactory fin such as aluminum which is also advantageous because of its cheapness, lightweight characteristics and ability to transfer heat efficiently and quickly.

As will hereinafter appear, the method of making a finned tube contemplated by the present invention, includes a brazing step and, therefore, as herein used, the term "brazing" shall be understood to mean a metal-joining process for producing coalescence by heating at temperatures approximately from 750° F. to 850° F. through use of a nonferrous, brazing alloy or filler metal having a melting point well below that of the metals to be joined.

By virtue of the fact, therefore, that the process cannot involve a melting of the base metal parts as is the case in a true welding process, it becomes necessary to first provide a closely fitted joint to enable movement of the molten brazing or filler metal between the proximal surfaces of the base metals by capillary attraction. Furthermore, since it is not feasible to provide a lap joint or other type of strong interengagement between the fin and the tube, and since a butt joint which must be employed in the method is not of itself sound, it is necessary to reinforce the juncture by effecting the production of fillets from the intermediate brazing alloy.

However, in order to maintain the fused brazing alloy adjacent the area of the fin proximal to the tube it has been found that the tube having the fin wound spirally thereon, should be rotating continuously throughout the brazing process.

It may be assumed in further description of the method that the metal tube is of copper having a melting point of approximately 1083° C. and that the fin is composed of aluminum having a melting point of 660° C. In order to braze the inner edge of the aluminum fin which is in abutting relationship to the copper tube, to the surfaces of the latter, it is necessary to produce an alloy system and, therefore, to employ a fusible alloy of metals capable of not only adhering to the two base metals, copper and aluminum, but of creating a metallic union by partial fusing of the metal surfaces to be interconnected. It is for this reason that a nonferrous metal compound is incorporated into the fluxing material, such compound being capable of forming a brazing alloy which upon cooling, firmly attaches the fin to the tube. The compound that is initially placed on the tube by virtue of applying the fluxing material to the tube, must be of easier fusion than the two similar or dissimilar metals to be joined.

It has been found that compounds such as zinc and cadmium or other nonferrous metals are especially suitable for the reason that these compounds for the most part have melting points within the desired range, and further that the free metal produced by the heating step forms a brazing alloy which results in an excellent metallurgical bond between the fin and the tube. It is manifest, however, that many metal compounds of the desired fusibility can be employed in the present process, such as metal chlorides, for the reason that the aluminum will react with the chloride molecule and be driven off as a gas, leaving the metal molecule to unite with the fused surfaces of the tube and the edge of the fin proximal to the tube.

The chemical fluxing material employed to remove and inhibit interfering films and oxides on the surfaces of the tube and the fin should be chosen to assure a sound brazed joint and it has been found that if the fin employed is made of aluminum and the tube of copper, a fluxing material including the following constituents performs the required functions of removing the interfering impurities and producing a suitable brazing alloy between the fin and the tube:

| | Percent by weight |
|---|---|
| Zinc Oxide | 10 to 20 |
| Zinc Chloride | 50 to 70 |
| Ammonium Chloride | 2 to 5 |
| Sodium Fluoride | 1 to 3 |
| Water | 15 to 20 |

The above formula may be varied by the inclusion of wetting agents as desired, and it is manifest that the exact quantities of each of the components in the formula may be varied. Also it is to be understood that additional substances may be added as desired, such as cadmium or other suitable metal compounds.

The means for heating the finned tube such as by torch, induction, or furnace brazing may be chosen to suit the desires of the manufacturer, but the method of the present invention is particularly adapted for permitting utilization of resistance or induction brazing wherein resistance to the passage of low voltage and high amperage furnishes the necessary heat. It is manifest, however, that any suitable method of heating the tube and fin thereon to a sufficient temperature to fuse the nonferrous compound, the outer surface of the tube and one edge of the fin proximal to the tube can be employed, but a process employing electro-thermal agitation of the molecular structure is preferable.

A brazing machine capable of carrying the abovementioned functions is diagrammatically shown in Fig. 1 of the drawings and designated generally by the numeral 110, and through which an elongated metal tube 112 is fed or advanced along a rectilinear, horizontal path of travel and simultaneously rotated on its longitudinal axis by motivating apparatus 114 supported by structure indicated generally by 116. Apparatus 114 includes a plurality of angularly disposed rollers 118 bearing against tube 112 in such a manner as to impart rotation and advancement at the desired speed, it being manifest that upon varying the relative rotation and angularity of rollers 114, rotation and advancement of tube 112 is accordingly varied.

The means for driving rollers 118 includes a primary shaft 120 underlying tube 112 in parallelism therewith and supported by suitable bearings 122, shaft 120 having a pulley 124 at one end thereof and a sprocket wheel 126 at the other end thereof. A prime mover 128 mounted on structure 116 is operably coupled to pulley 124 by rotatable connecting structure 130 and a continuous chain 132 interconnects wheel 126 and a sprocket wheel 134 for each of the rollers 118 respectively. Rollers 118 and their respective wheels 134 are interconnected by shafts 136 having the necessary universal joints 138 connected therein, one end of shaft 136 being rotatably supported in structure 116 by virtue of bearings 140.

Tube 112 is rotated and advanced through spray chamber 142 into which flux material 144 is sprayed onto tube 112 by means of a nozzle 146 communicating with a source of supply (not shown) by means of conduit 148. Excess flux material 144 is removed from chamber 142 by drain conduit 150, a relatively thin, but uniform, coating of the material 144 should be applied to the tube 112 and, therefore, it is desirable to utilize a brush 152 disposed in wiping engagement with tube 112 in chamber 142 directly following the spray of flux material 144.

After the flux 144 is brushed evenly on tube 112, and while the latter is still moving forwardly and rotating, an elongated, flexible strip 154 is directed to tube 112 and wound thereon in the form of a spiral fin 156 through utilization of forming rolls 158 and 160 operably connected to structure 130, fin 156 passing between ironing plates 162 after being acted upon by rolls 158 and 160.

The next step in affixing fins 156 to tube 112 consists of passing the same through an electrical induction furnace having a plurality of heavy copper coils through which tube 112 is continuously advanced and rotated. A suitable induction furnace coil is schematically represented at 164, it being understood that an insulated housing (not shown) surrounds the same.

Coils 164 are connected to a suitable power source by lead lines 166 and 168, it being understood that the circuit includes a high frequency current transformer (not shown) and additionally there may be provided means for regulating the current.

A conveyor system 182 is provided for supporting the tube 112 thereon as it emerges from the induction furnace, system 182 including a plurality of rollers 184 on which the finned tube 112 may progressively roll.

It is apparent that there is now presented a continuous, uninterrupted process for affixing spiral fins to a metal tube, but at times it is not desirable to braze the fins to the tube immediately after brushing the fluxing material thereon and winding the fin strip therearound, and accordingly, a machine suitable for carrying out other objects of the instant invention is shown diagrammatically in Figs. 2 to 5 of the drawings wherein it can be seen that a heat exchanger tube 10 having a spiral fin 11 wound therearound, has its opposite ends secured in a resistance brazing machine indicated generally by the numeral 12. Machine 12 includes a pair of suitably spaced, upright supports 14 and 16 mounted on base 17, each of the supports 14 and 16 having a bearing 18 mounted on the uppermost end thereof disposed to receive horizontal shafts 20 and 22 respectively in such a manner that the longitudinal axes of shafts 20 and 22 are in exact alignment.

Clamping blocks 24 and 26 are secured to adjacent ends of shafts 20 and 22 respectively, each of the blocks 24 and 26 including a lower section 28 rigidly secured to semi-cylindrical segments 30 and 32 integral with shafts 20 and 22 respectively. An upper section 34 mounted on each of the sections 28 in symmetrical overlying relationship is swingable by virtue of hinge 36 interconnecting sections 28 and 34 at one side thereof. A latch 39 is provided on the sides of sections 28 and 34 opposite to hinge 36 for releasably holding the same together.

Each of the clamping blocks 24 is provided with an elongated, cylindrical socket 38 of a size sufficient to hold tube 10 securely between sections 28 and 34 when latch 39 is fastened. It is noted in Fig. 3 that the socket 38 may consist of semi-cylindrical portions in each of the sections 28 and 34, but it is pointed out that the only consideration is that the longitudinal axes of sockets 38 be in alignment with the axes of rotation of shafts 20 and 22.

Means is provided for driving shaft 20 at a constant speed, and in this respect there may be provided a prime mover 40 operably coupled with a worm gear box 42, drive shaft 44 of box 42 having a pulley 46 thereon in alignment with a pulley 48 on shaft 20, there being an endless V-belt 50 trained over the pulleys 46 and 48.

A conductor line 52 having a switch 56 therein is connected to bearing 18 on support 14 and a conductor line 54 is connected to bearing 18 of support 16. The necessary equipment for carrying out the heating step is not fully illustrated in the drawing but must include a high secondary current transformer connected to suitable power lines and in circuit with lines 54 and 56. Additionally there may be provided in the circuit a means for regulating the current, and a timer capable of controlling switch 56. Bearings 18 are insulated from the supports 14 and 16 respectively by virtue of insulating material 58 and belt 50 is also formed of non-conducting material.

It is manifest that support 16 may be constructed so that it is adjustable with respect to base 17 whereby a tube 10 of any desired length may be inserted in the machine.

Manifestly, the amount of heat produced by a given brazing current for a unit of time is determined by the electrical resistance of the tube 10 and the fin 11, but in any event, the heating and subsequent cooling step should be rapid and uniform to prevent annealing of the copper from which the tube 10 is made. The high amperage current passed through the tube 10 creates a uniform temperature because of the uniform electrical resistance of the tube 10.

In carrying out the invention an electrical current of sufficient intensity to properly unite fin 11 with a tube 10 is employed. When the fin is applied to a 12 foot tube, an electrical current should be supplied with sufficient intensity to provide a heating temperature of approximately 800° F. Under such conditions the fusing operation is completed in from 18 to 25 seconds. These experimental figures are predicated upon a copper tube having a ⅝ inch outside diameter wherein the thickness of the wall thereof is .025 inch.

Ten aluminum fins 34 per inch were applied to the tube and the width of the strip 32 from which the fins 34 were made, was 13/32 inch. Discrepancies from theoretical values are accounted for in radiation loss and resistance within secondary leads. In the event the method is employed in connection with tubes of higher resistance such as steel, a higher voltage must be used to attain sufficient amperage. Tubes of larger diameters and heavier walls require either additional amperage or a longer period of time. It must be kept in mind, however, that the time interval should be kept at a minimum for best results.

It is appreciated that a relatively high brazing current is necessary in order to produce a temperature of approximately 750° to 850° F. but care must be exercised in reducing the time interval to a minimum so as to prevent annealing of the copper and while producing a surface alloy.

The zinc chloride in the fluxing material initially applied to tube 10 combines with a portion of the aluminum which has been fused by the heating process, the result being formation of pure zinc metal and driving off of aluminum chloride. The same is true if a cadmium compound is included in the fluxing material, a brazing alloy composed of a zinc-cadmium complex resulting from the heating step. Such a zinc-cadmium alloy not only combines with the fused surface of the tube 10 but also combines with the fused surface of the edge of fin 11 proximal to tube 10. In this connection it is pointed out that the brazing alloy produced in the resistance or induction process flows into the relatively tight butt joint between fin 11 and tube 10 as shown in Fig. 4 to present upon cooling, a tight metallurgical bond between the fin 11 and tube 10. There is also sufficient abundance of brazing alloy present to coat the tube and to produce fillets 60 on opposite sides of fin 11 as shown in Fig. 4.

The entire metallurgical bond effectively transfers heat by virtue of continuous metal fibers and complete absence of any insulating oxides between the tube 10 and the fin 11 and the joint is extremely strong as compared with methods of joining heretofore recommended in this field.

The finned tube is thereupon immersed in a suitable washing fluid to loosen any residue that might have deleterious effects upon the finished product by its corrosive action. Following such soaking step, the loosened residue is flushed away or subjected to an agitated rinse and the finned tube is thereupon ready for subsequent use in heat exchange apparatus as may be desired.

It is seen that the zinc chloride forming a part of the fluxing material is converted to zinc metal and aluminum chloride. The brazing temperature is well above the sublimation point of the aluminum chloride and the latter escapes in the form of a gas as it is formed, leaving the pure zinc metal which forms a part of the bonding alloy. The same is equally true if other metal compounds such as cadmium are incorporated into the fluxing material.

The ammonium chloride in the flux also decomposes and the small amount of residual deposit is composed mostly of oxides of a noncorrosive nature.

The step of rotating the tube 10 while fin 11 is being brazed thereto is exremely important for the reason that if sufficient fluxing material is applied to the tube to give a tight metallurgical bond between fin 11 and tube 10, there is a tendency for the fused brazing alloy and flux to run toward the lowermost side of tube 10 unless the same is rotated at a speed sufficient to maintain the fused alloy at the base of fin 11 proximal to tube 10. By such rotation there is assurance of a uniform joint between fin 11 and tube 10 around the entire circumference of the tube. Also, the appearance of the finished tube is improved because the brazing alloy is retained at the base of fin 11 and does not mar the surfaces thereof by running toward the outer portions of the fin 11.

It is of further importance in this respect that since a uniform distribution of the brazing alloy is maintained around the entire circumference of the tube, the amount of fluxing material initially applied to the tube may be substantially reduced below what would be necessary if the fin 11 were brazed to the tube 10 while the same was maintained in one position; for the reason that an allowance would otherwise have to be made for the fused alloy which gravitated toward the lower portion of the tube.

Finned tubes made according to the invention hereinabove set forth are especially well adapted for receiving high temperature fluids without any deleterious effect upon the joint that interconnects the tube 10 and the fin 11.

The method above described is not necessarily limited to spiral fins 34 since plate or disc fins may be utilized if desired. Good results are also attained when following the method of the present invention in attaching aluminum fins to carbon steel, stainless steel or aluminum. It is to be understood that wherever used hereinabove, aluminum and copper shall be understood to include the family of aluminum alloys and the family of copper alloys respectively.

The temperature range above set forth contemplates an approximate upper limit which will vary according to many factors, chief of which is the time during which the materials are held at brazing temperature, but must be sufficiently low to prevent annealing. The lower limit should be above soft soldering temperatures for best results.

Having thus described the invention what is claimed as new and desired to be secured by Letters Patent is:

1. A method of brazing an aluminum fin to a tube having an outer surface of copper, said method including the steps of initially placing a substantially fluid coating on said outer surface of the tube and including by weight, 10% to 20% of zinc oxide, 50% to 70% of zinc chloride, 2% to 5% of ammonium chloride, 1% to 3% of sodium fluoride and 15% to 20% of water; applying the fin to the tube with the inner edge surface thereof in close abutting relationship to said outer surface of the tube; heating the finned tubing to a brazing temperature within the range of 750° F. to 850° F., said zinc compounds reacting with the fin to produce an intermediate bonding alloy capable of flowing into the joint between the inner edge surface of the fin and said outer surface of the tube by capillary action and uniting with the fin and the tube to thereby present, upon cooling of the components, a sound interconnection of high heat conductivity between the fin and the tube; and rotating the finned tubing on its logitudinal axis simultaneous with heating of the same to said temperature at a speed sufficient to prevent running of said substance when the latter is in a molten state and to cause the same to form fillets along opposed sides of the fin adjacent said edge.

2. A method as set forth in claim 1 wherein said heating is produced by electrical induction.

3. A method as set forth in claim 1 wherein a cadmium compound is incorporated in said fluid coating placed on the outer surface of the tube.

References Cited in the file of this patent

UNITED STATES PATENTS

| | | |
|---|---|---|
| 2,661,525 | Edwards | Dec. 8, 1953 |
| 2,872,730 | Jones | Feb. 10, 1959 |